US011880256B2

(12) United States Patent
Muthiah (10) Patent No.: US 11,880,256 B2
(45) Date of Patent: Jan. 23, 2024

(54) DATA STORAGE DEVICE AND METHOD FOR ENERGY FEEDBACK AND REPORT GENERATION

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 48 days.

(21) Appl. No.: 17/829,563

(22) Filed: Jun. 1, 2022

(65) Prior Publication Data

US 2023/0393640 A1 Dec. 7, 2023

(51) Int. Cl.
*G06F 1/3225* (2019.01)
*G06F 3/06* (2006.01)

(52) U.S. Cl.
CPC .......... *G06F 1/3225* (2013.01); *G06F 3/0604* (2013.01); *G06F 3/0653* (2013.01); *G06F 3/0679* (2013.01)

(58) Field of Classification Search
None
See application file for complete search history.

(56) References Cited

U.S. PATENT DOCUMENTS 5,894,579 A * 4/1999 Fujihara .................... G06F 1/26
713/324
11,074,011 B2 7/2021 Muthiah

OTHER PUBLICATIONS

U.S. Appl. No. 17/198,534, filed Mar. 11, 2021 entitled "Data Storage Device and Method for Application Indentifier Handler Heads-Up for Faster Storage Response."

* cited by examiner

*Primary Examiner* — Charles J Choi
(74) *Attorney, Agent, or Firm* — Crowell & Moring LLP (57) ABSTRACT

A data storage device and method for energy feedback and report generation are provided. In one embodiment, a data storage device is provided comprising a memory and a controller. The controller is configured to maintain an association between logical addresses and application identifiers of applications on a host; determine power implications associated with a command to access a logical address of the memory; generate a report on the power implications, wherein the report identifies an application identifier associated with the logical address; and provide the report to the host. Other embodiments are possible, and each of the embodiments can be used alone or together in combination.

20 Claims, 6 Drawing Sheets

ENERGY FEEDBACK

DATA STORAGE DEVICE AND METHOD FOR ENERGY FEEDBACK AND REPORT GENERATION

BACKGROUND

Conserving energy is an important parameter in some embedded data storage devices that strive to optimize energy consumption. When an application in a host accesses a data storage device or a compute runs in the data storage device, the host may need information to determine the energy impact on the ecosystem for running those applications. The host may calculate the energy impact based on the data access of each application; however, such information may not be complete since the data access does not result in just data access but also in storage overheads, which depend on the nature of the data. Storage overheads may involve not only control overheads but also data overheads, and overheads can be different based on the data pattern (e.g., in terms of alignment and randomness). All of these overheads add to energy consumption.

DETAILED DESCRIPTION

Overview

By way of introduction, the below embodiments relate to a data storage device and method for energy feedback and report generation. In one embodiment, a data storage device is provided comprising a memory and a controller. The controller is configured to maintain an association between logical addresses and application identifiers of applications on a host; determine power implications associated with a command to access a logical address of the memory; generate a report on the power implications, wherein the report identifies an application identifier associated with the logical address; and provide the report to the host.

In some embodiments, the application identifiers are tagged by the host to data received by the data storage device.

In some embodiments, the association is stored in a logical-to-physical addresses map.

In some embodiments, the power implications comprise power spent on executing the command, a power credit of a background operation associated with the command, a power credit associated with an amount of control data that the command triggers, a power credit associated with a burst mode, a power credit associated with trim usage, or a power credit associated with maintaining the association.

In some embodiments, the controller is further configured to provide a suggestion to the host on access size.

In some embodiments, the controller is further configured to provide a determination to the host on an energy requirement of each of a plurality of compute steps associated with a logical address.

In some embodiments, the controller is further configured to generate a plurality of reports on power implications of namespace or endurance groups.

In some embodiments, the controller is further configured to generate a plurality of reports, one report for each of a plurality of hosts.

In some embodiments, the controller is further configured to determine prorated energy consumption based on a number of units of work of memory reads/writes, a number of units of data transfer, a number of units of error correction code (ECC) decode/encode, controller power over prorated time, power spent by different components in the data storage device for a given host command, or background overhead.

In some embodiments, the controller is further configured to suggest data pattern usage to the host.

In some embodiments, the controller is further configured to monitor energy on a command, application, overhead, or host basis.

In some embodiments, the controller is further configured to perform stream analysis, perform a data alignment check, or suggest a data-size band on architecture.

In some embodiments, the controller is further configured to perform an energy-to-compute-ratio evaluation.

In some embodiments, the memory comprises a three-dimensional memory.

In another embodiment, a method is provided that is performed in a data storage device. The method comprises: maintaining a mapping of logical addresses and application identifiers of applications on a host; generating an energy report on power implications associated with a command to access a logical address of the memory, wherein the energy report identifies an application identifier associated with the logical address; and providing the energy report to the host.

In some embodiments, the method further comprising providing a suggestion to the host on access size.

In some embodiments, the method further comprises providing a determination to the host on an energy requirement in each of a plurality of compute steps associated with a logical address.

In some embodiments, the method further comprises generating a plurality of energy reports on power implications of namespace or endurance groups.

In some embodiments, the method further comprises generating a plurality of energy reports, one energy report for each of a plurality of hosts.

In another embodiment, a data storage device is provided comprising a memory; means for determining power implications associated with a command to access a logical address of the memory; and means for providing, to the host, a report on the power implications of the command, wherein the report identifies an application identifier associated with the logical address.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
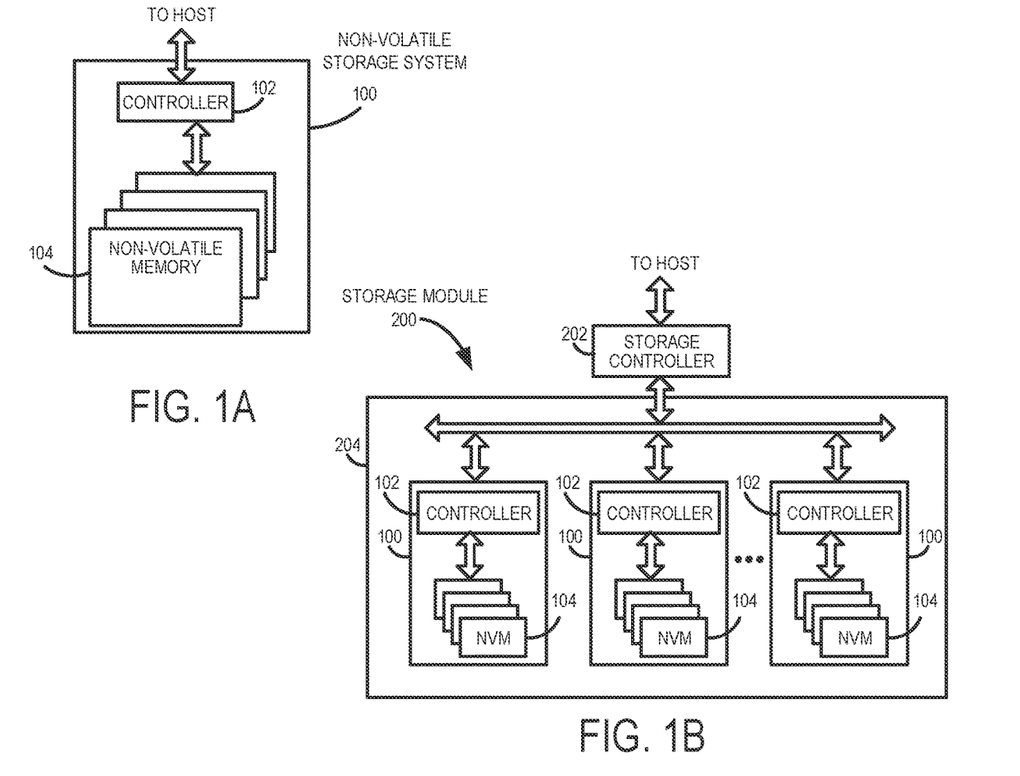
FIG. 1A is a block diagram of a data storage device of an embodiment.
FIG. 1B is a block diagram illustrating a storage module of an embodiment.
Figure 1C:
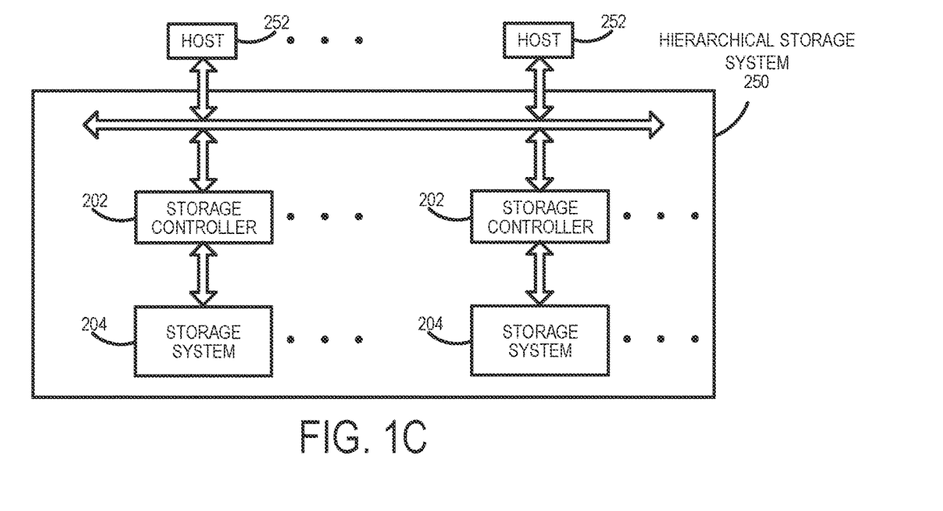
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
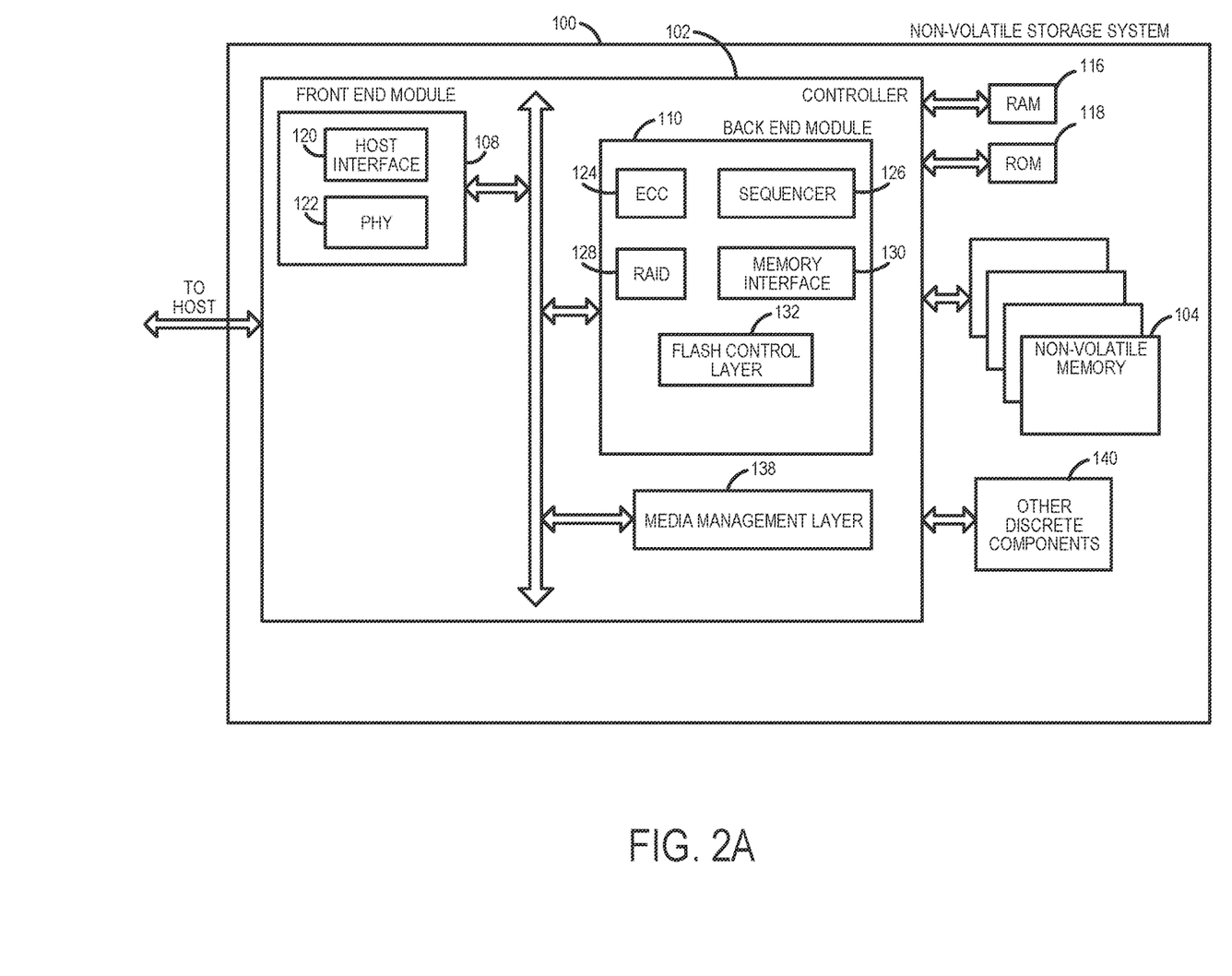
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a selfcontained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
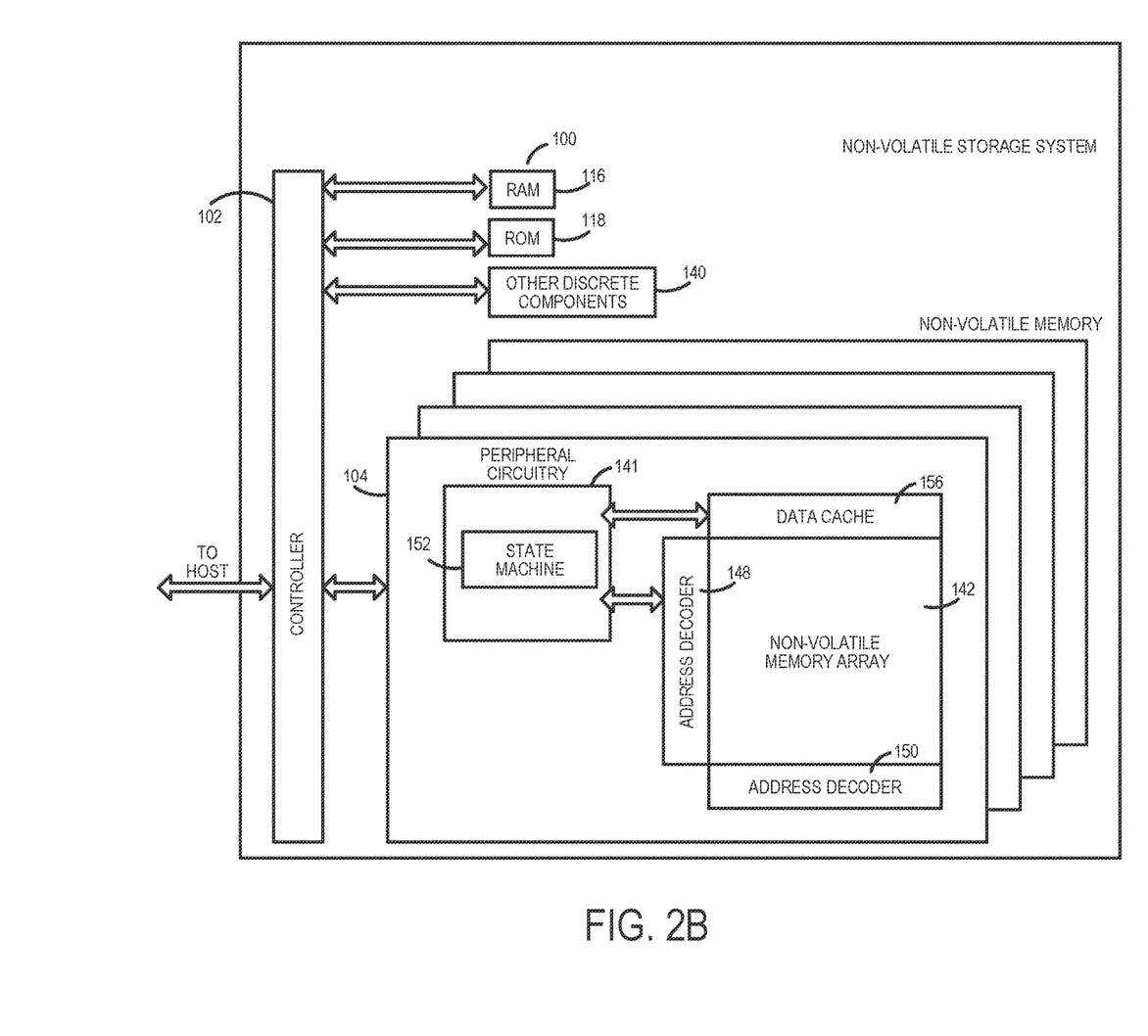
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
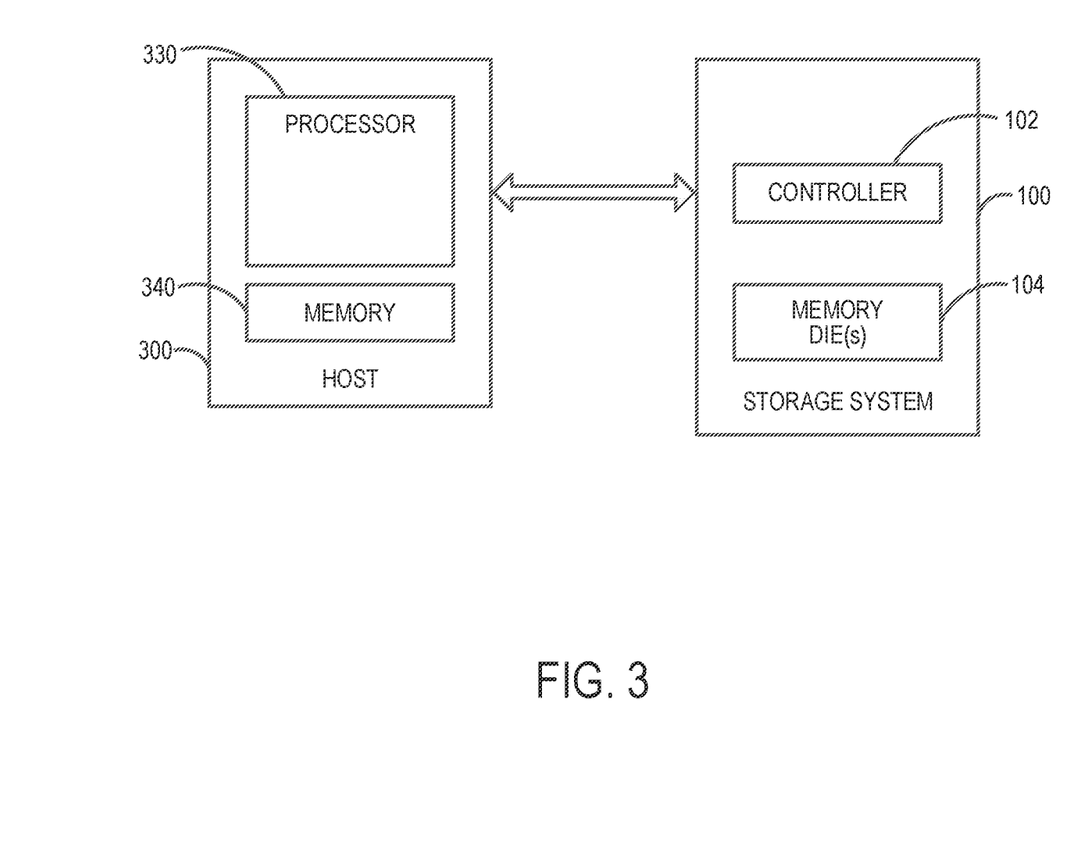
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, conserving energy is an important parameter in some embedded data storage devices that strive to optimize energy consumption. When an application in a host accesses a data storage device or a compute runs in the data storage device, the host may need information to determine the energy impact on the ecosystem for running those applications. The host may calculate the energy impact based on the data access of each application; however, such information may not be complete since the data access does not result in just data access but also in storage overheads, which depend on the nature of the data. Storage overheads may involve not only control overheads but also data overheads, and overheads can be different based on the data pattern (e.g., in terms of alignment and randomness). All of these overheads add to energy consumption. These embodiments can be used to address the energy consumption problem by helping the host gauge the energy impact of various applications and compute in the context of storage usage by providing an energy report and/or by providing feedback to the host for energy-efficient storage based on underlying firmware architecture.

More specifically, in one embodiment, the controller 102 of the data storage device 100 can associate input-output (IO) data with an application identifier (ID) and maintain an application-ID-to-logical-data mapping in its control structure; optionally, as an extended member of a logical-to-physical address (L2P) mapping table, similar to what is described in U.S. patent application Ser. No. 17/198,534, which is hereby incorporated by reference. The host 300 can provide the application identifier for data. Once the logical data is associated to an application, the controller 102 can accumulate and update the prorated power spent (or power credit points hereafter) on the IO access with respect to the host command, the prorated power credit of a background operation associated with that host command (e.g., garbage collection, read scrub, and wear leveling), the power credit associated to the amount of control data that the host command triggers, the extra power credit associated with any special requirement of an application (such as burst mode owing to different NAND trim usage), and other power credits to the mapping table against an application identifier.

The controller 102 can also suggest a preferred IO size based on underlying firmware architecture or data alignment based on L2P management for better command utilization leading to energy efficient storage. For example, the controller 102 can suggest an access size of 512 KB rather than 384 KB consistent with its direct write firmware architecture leading to less or no data padding in TLC blocks during writes. The host 300 can use this feedback to consolidate the sequential writes consistent with the optimal device requirement. This may not have much impact on the host 300, but it may improve energy efficiency of the data storage device 100 over time.

In applications involving storage-based cryptocurrencies, computation involves cryptography, hashing, digital signatures, and so on. In such cases, these embodiments can be extended to allow the data storage device 100 to be able to assist the host 300 in the exact determination of an energy requirement in each of the compute steps associated with a logical region. In this case, rather than having mapping at the logical or application level, mapping overhead can be increased to compute types in each logical level to generate a detailed energy report. The data storage device 100 may provide a consolidated report with information on how much power was spent on each compute step of different logical regions or for different applications. The host 300 may perform learning from this report to bias its future actions.

These embodiments can also be used in data centers where the data storage device 100 can send individual reports on namespace or endurance groups. In a system involving multiple SSDs connected to the host 300, each device can generate an energy report, and the host 300 can consolidate the reports of multiple applications and logical regions. Also, in a multi-host environment accessing one or more data storage devices, energy reports can be generated per host based on the accesses of each host and the associated applications.

In one embodiment, the controller 102 of the data storage device 100 determines the prorated energy consumption based on a number of units of work of NAND reads/writes (different power credits for SLC/TLC), a number of units of data transfer, a number of units of ECC decode/encode, controller power over prorated time, power spent by different components for a given host command, and all associated background overhead (approximate data may be statically available).

The controller 102 can share power credit points with the host 300, either based on logical region or based on application identifier. When special modes (such as burst performance modes) are ongoing, the controller 102 can scale the credit points to accommodate the delayed garbage collection to associate the delayed power utilization to this request.

The data pattern of each application can vastly impact the energy consumption in the data storage device 100. For example, a two-sector write into the data storage device 100 can take more power than an aligned eight-sector write, since an eight-sector write is just one 4 KB write, but a two-sectors write is a read-modify-write of 4 KBs involving a read from the memory 104 and a write to the memory 104, owing to usual L2P design in data storage devices. However, from a host perspective, a two-sector write is 1 KB, which is less than a 4 KB write. Hence, a report from the data storage device can help the host 300 consolidate the energy consumption of various applications. The host 300 can act upon this feedback to consolidate the writes and issue a fragment rather than frequent sector writes.

Similarly, random data can lead to a lot of control overheads as compared to sequential reads and writes. These overheads can result in power credits that are well measured in the data storage device 100. Further, a NAND write takes approximately the same amount of power to write 4 KB or 16 KB, but the transfer and ECC power requirements for 4 KB and 16 KB are different. This data is also accommodated in the power accumulation results; hence, forced flush on some logical data can be captured in this way.

Figure 4:
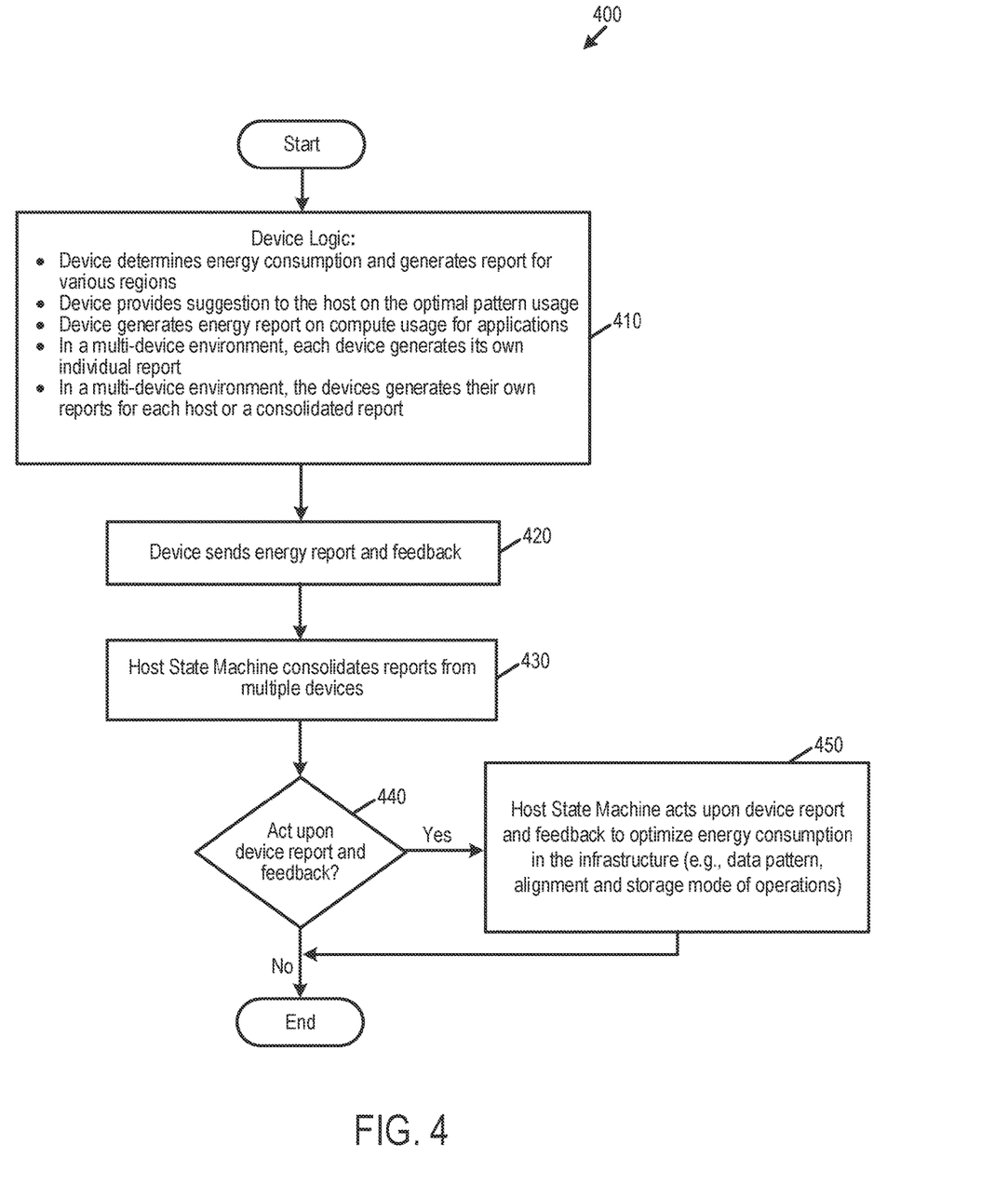
FIG. 4 is a flow chart of an example usage of a data storage device of an embodiment.

FIG. 4 is a flow chart 400 of an example usage of the data storage device 100. As shown in FIG. 4, in this embodiment, the data storage device 100 can take one or more actions (act 410). These actions include, but are not limited to, determine energy consumption and generate a report for various regions, provide a suggestion to the host on optimal pattern usage, generate an energy report of the compute usage for the application, generate an individual report, and generate a report for each host or a consolidated report. Next, the data storage device 100 sends the energy report and feedback (act 420). The host state machine then consolidates reports from several data storage devices (act 430). The host 300 then determines whether to act upon the device report and feedback (act 440). If the host 300 determines to act, the host state machine acts upon the device report and feedback to optimize energy consumption (act 450). Otherwise, the method ends.

Some data storage devices typically have a policy to perform garbage collection of sequential data during sequential workloads and perform garbage collection of random data during random workloads. In these cases, the power spent on applications using sequential data is for host sequential writes and sequential garbage collection, providing maximum efficiency per MB of data, as against poor efficiency for applications involving random workloads. Such an energy report distinguishes applications having different access pattern requests to the data storage device 100, especially in mixed-workload access patterns. The data storage device 100 may generate this report per power cycle, per device cycle, or in any other agreed-upon frequency. Alongside the report, the data storage device 100 may suggest IO practices consistent with its architecture. The host may use this information to rate the applications in the context of energy. In some cases, the host applications may even be tuned to be efficient based on power credit numbers. The application tuning may involve adjusting at least one of force flush usage, data alignment, IO size, and burst accesses.

Figure 5A:
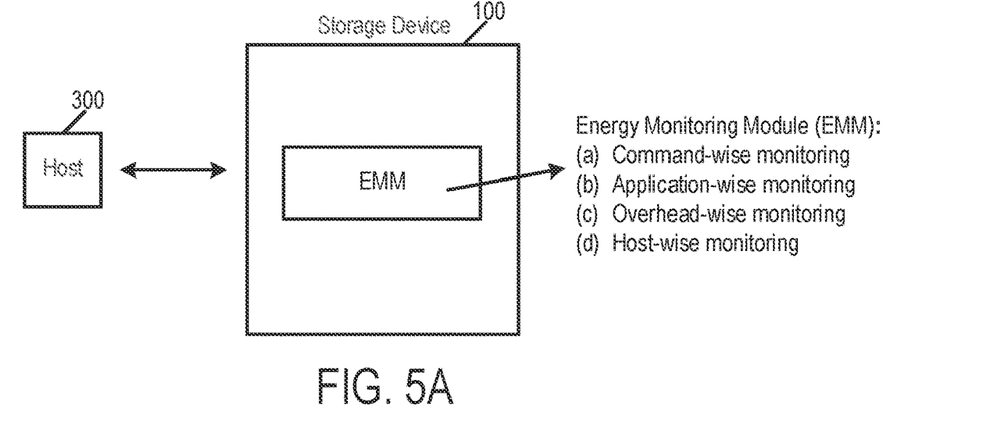
FIGS. 5A, 5B, and 5C are diagrams illustrating usage of a module in a data storage device of an embodiment.
Figure 5B:
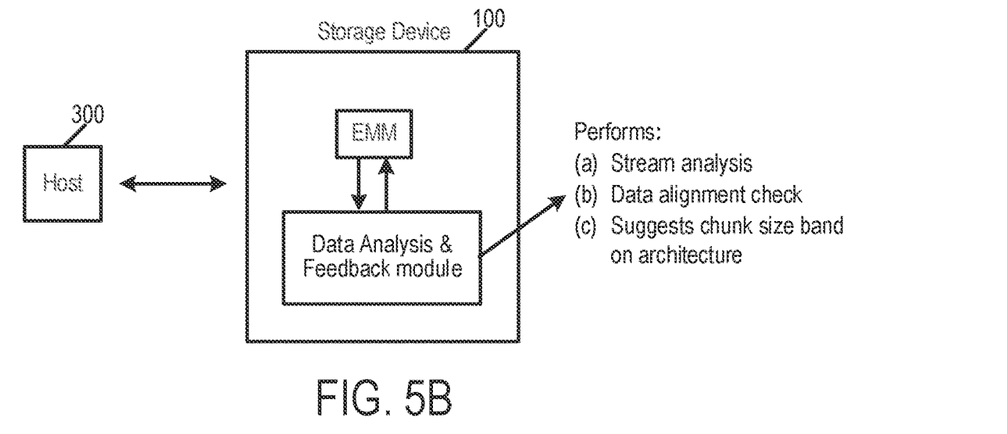
Figure 5C:
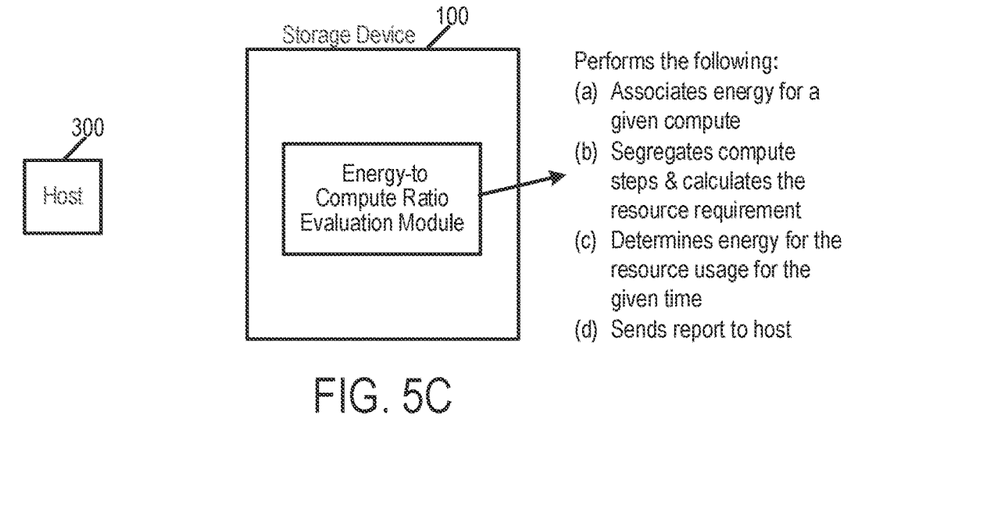

FIGS. 5A, 5B, and 5C are diagrams illustrating usage of a module in a data storage device of an embodiment. The module can be implemented in the controller 102. FIG. 5A shows that the energy monitoring module (EMM) in the data storage device can implement command-wise monitoring, application-wise monitoring, overhead-wise monitoring, and/or host-wise monitoring. FIG. 5B shows that the energy monitoring module (EMM) in the data storage device 100 can perform stream analysis, perform a data alignment check, and/or suggest a chunk-size band on architecture. FIG. 5C shows that an energy-to-compute-ratio evaluation module in the data storage device 100 can associate energy for a given compute, segregate compute steps and calculate the resource requirement, determine energy for the resource usage for the given time, and/or send a report to the host 300. Energy report data can lead to energy efficiency, and the host 300 may bias its actions based on this report.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
      maintain an association between logical addresses and application identifiers of applications on a host;
      determine power implications associated with a command to access a logical address of the memory;
      generate a report on the power implications, wherein the report identifies an application identifier associated with the logical address; and
      provide the report to the host.

2. The data storage device of claim 1, wherein the application identifiers are tagged by the host to data received by the data storage device.

3. The data storage device of claim 1, wherein the association is stored in a logical-to-physical addresses map.

4. The data storage device of claim 1, wherein the power implications comprise power spent on executing the command, a power credit of a background operation associated with the command, a power credit associated with an amount of control data that the command triggers, a power credit associated with a burst mode, a power credit associated with trim usage, or a power credit associated with maintaining the association.

5. The data storage device of claim 1, wherein the controller is further configured to provide a suggestion to the host on access size.

6. The data storage device of claim 1, wherein the controller is further configured to provide a determination to the host on an energy requirement of each of a plurality of compute steps associated with a logical address.

7. The data storage device of claim 1, wherein the controller is further configured to generate a plurality of reports on power implications of namespace or endurance groups.

8. The data storage device of claim 1, wherein the controller is further configured to generate a plurality of reports, one report for each of a plurality of hosts.

9. The data storage device of claim 1, wherein the controller is further configured to determine prorated energy consumption based on a number of units of work of memory reads/writes, a number of units of data transfer, a number of units of error correction code (ECC) decode/encode, controller power over prorated time, power spent by different components in the data storage device for a given host command, or background overhead.

10. The data storage device of claim 1, wherein the controller is further configured to suggest data pattern usage to the host.

11. The data storage device of claim 1, wherein the controller is further configured to monitor energy on a command, application, overhead, or host basis.

12. The data storage device of claim 1, wherein the controller is further configured to perform stream analysis, perform a data alignment check, or suggest a data-size band on architecture.

13. The data storage device of claim 1, wherein the controller is further configured to perform an energy-to-compute-ratio evaluation.

14. The data storage device of claim 1, wherein the memory comprises a three-dimensional memory.

15. A method comprising:
    performing the following in a data storage device comprising a memory:
       maintaining a mapping of logical addresses and application identifiers of applications on a host;
       generating an energy report on power implications associated with a command to access a logical address of the memory, wherein the energy report identifies an application identifier associated with the logical address; and
       providing the energy report to the host.

16. The method of claim 15, further comprising providing a suggestion to the host on access size.

17. The method of claim 15, further comprising providing a determination to the host on an energy requirement in each of a plurality of compute steps associated with a logical address.

18. The method of claim 15, further comprising generating a plurality of energy reports on power implications of namespace or endurance groups.

19. The method of claim 15, further comprising generating a plurality of energy reports, one energy report for each of a plurality of hosts.

20. A data storage device comprising:
    a memory;
    means for determining power implications associated with a command to access a logical address of the memory; and
    means for providing, to the host, a report on the power implications of the command, wherein the report identifies an application identifier associated with the logical address.

* * * * *